Figure 1:
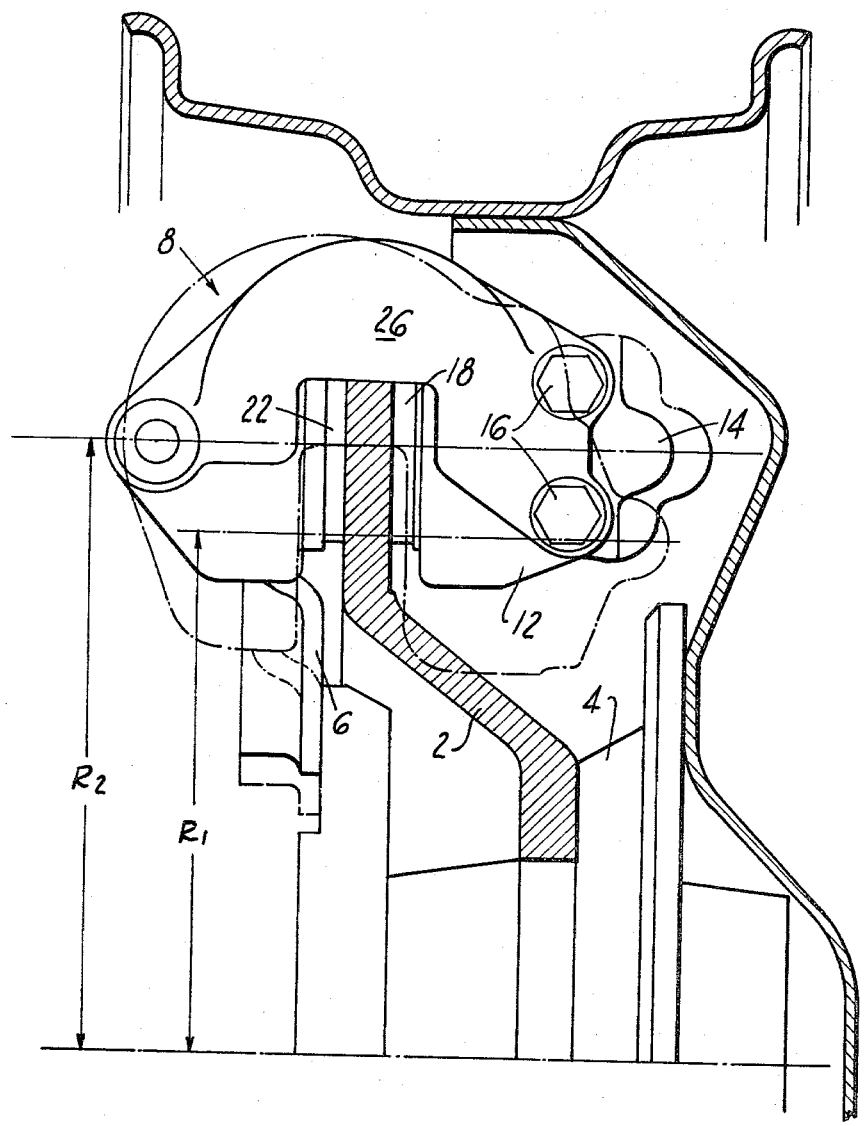

July 20, 1965 R. A. L. THIRION 3,195,687
CALIPER FOR DISC BRAKES
Filed Dec. 18, 1962 2 Sheets-Sheet 1

INVENTOR.
RENE ALPHONSE THIRION
BY
Sheldon F. Raizes
ATTORNEY

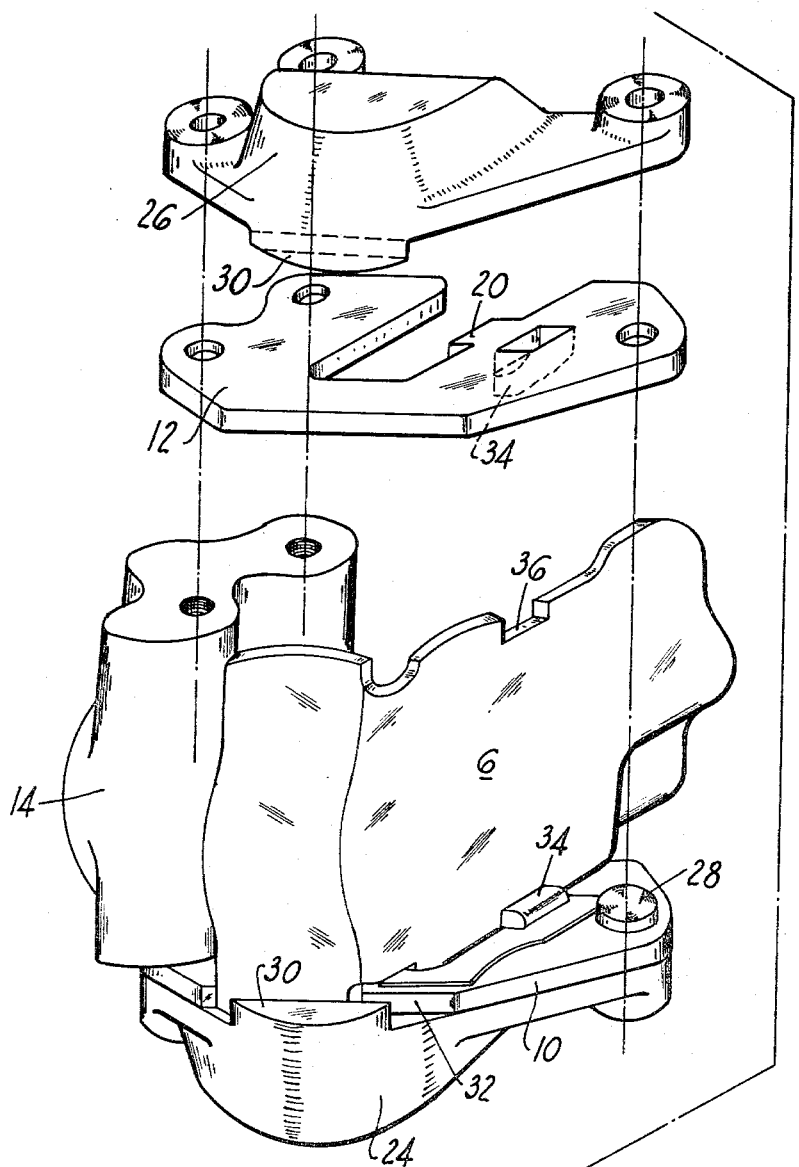

United States Patent Office 3,195,687
Patented July 20, 1965

3,195,687
CALIPER FOR DISC BRAKES
René Alphonse Louis Thirion, Paris, France, assignor to Société Anonyme D.B.A., Paris, France, a company of France
Filed Dec. 18, 1962, Ser. No. 245,559
Claims priority, application France, Jan. 5, 1962, 883,996
3 Claims. (Cl. 188—73)

The invention relates to spot type disc brakes in which the applying device for friction members is carried by a caliper straddling the periphery of the disc to be braked, and more particularly aims to the construction of a caliper for this type of brake.

In brakes of this type, the forces exerted on the legs of the caliper during braking tend to move the legs axially apart and subject the portion of the caliper overlying the disc, which will be referred to hereafter as the back portion of the caliper, to a bending moment. It is necessary that the modulus of inertia of a section of the back portion of the caliper parallel to the disc be large enough so the back portion can resist the bending moment. Yet, when brakes of this type are used on automotive vehicles where the brake is located inside the wheel and where the back portion of the caliper is located between the periphery of the disc and the rim of the wheel, the radial height of the back portion of the caliper must be reduced as much as possible to allow the use of a disc having a large diameter relative to the wheel diameter and thus increase the efficiency of the brake.

The spot type disc brakes presently used are generally equipped with integral cast calipers which have the drawback of requiring more or less complex machining operations for their fabrication but which allow a better use of the space inside the wheel because the back portion of such calipers is circumferentially extended and it is possible to reduce its radial height while maintaining a sufficient modulus of inertia of a section of the back portion which is parallel to the disc.

It has been proposed to use calipers formed of two C-shaped yoke members made from sheet metal, circumferentially spaced one from the other and interconnected at least on one side of the disc by a brace member. The fabrication of these calipers requires only simple punching and stamping operations and for that purpose their cost is low. But the forces parallel to the disc axis exerted on the caliper during braking are resisted only by the sheet metal yoke members which have a relatively small thickness and it is therefore necessary to impart to the back portion of the yoke members a relatively important radial height. Consequently, a brake equipped with a caliper of this type can be used inside a wheel of an automotive vehicle with relatively small diameter discs only.

The object of the present invention is to provide a caliper for a disc brake of the type comprising two yoke members made of sheet metal and which possesses the advantages of cast calipers, i.e. which allows the use of relatively large diameter discs inside the wheel to be braked.

For that purpose the present invention proposes to associate to each yoke member a strengthening cast member suitably attached to the yoke member and partaking of the stresses to which the back portion of the yoke member is subjected.

The features of the invention and the appendant advantages will appear from the following description of one embodiment of the invention given as example, description which refers to the accompanying drawings in which:

FIG. 1 is a side view of a brake equipped with a caliper made in accordance with the invention; and FIG. 2 is a perspective view of the caliper and the support member of the disc brake shown in FIGURE 1, some parts of the caliper being represented disassembled to more clearly show the structure of the caliper.

The disc brake shown in FIGURE 1 is a spot type disc brake in which the caliper is free to move axially with respect to a fixed support member but is retained against circumferential displacement by said fixed support.

This brake comprises essentially a disc 2 secured to a hub 4 of the wheel to be braked, a support plate 6 secured to a wheel knuckle or axle, and a caliper 8 which is slidably mounted on the support plate 6 for axial movement with respect thereto.

The caliper 8 is formed of two C-shaped yoke members 10 and 12, cut from sheet metal, which are interconnected on one side of the disc by the body 14 of a hydraulic motor to which they are secured by means of bolts 16 and are interconnected on the other side of the disc by a friction pad 22 which is supported on tenons 20 provided on the adjacent legs of the yoke members. The other friction pad 18 is carried by the piston of the hydraulic motor. A strengthening cast member 24, 26 is attached to each yoke member by means of bolts 16 and by a screw 28. Each strengthening member has a lug 30 which overlies the back portion of the yoke member, and a radial space is provided between the back portion of the yoke member and the lug 30 to form an axially extending guiding groove 32 which receives the edge of a transverse portion of the support plate 6. The caliper 8 is also guided by stamped bosses 34 formed on each yoke member and located in notches 36 cut in the portion of the support plate which is parallel to the disc 2. The portion of the strengthening members lying flat against the back portion of the yoke members is relatively thick and although the radial height of the back portion of the yoke members and of the strengthening member is small, the assembly has a high moment of inertia with respect to an axis perpendicular to the yoke members.

In FIGURE 1 there is diagrammatically shown in phantom lines, a caliper of the prior art in which the two yoke members made of sheet metal constitute the only parts of the caliper resisting the bending moment resulting from forces applied to the legs of the yoke members. It must be noted that the radial height of the prior art caliper is much larger than that of the caliper made in accordance with the invention. The caliper of the invention allows the use of a disc which is of larger diameter than does the caliper of the prior art. Consequently the moment of a determined braking force with respect to the disc axis is much smaller with the caliper of the invention than with the caliper of the prior art, and a brake equipped with the caliper of the invention is much more efficient than a brake equipped with the caliper of the prior art.

The provision of two strengthening members does not substantially increase the cost of the brake because these members are very simple in shape and can be easily cast and machined.

Although the invention has been described in its application to a floating caliper disc brake, it is obvious that it can be applied to any other spot type disc brake.

Also it is obvious that the invention is not limited to the described particular shapes of the calipers and strengthening members, as the shapes of these members depends upon the particular use for which the brake is designed.

What is claimed is:

1. In a disc brake having a rotatable disc, a caliper comprising: a cylinder housing on at least one side of said disc, a pair of circumferentially spaced generally C-shaped sheet metal yoke members embracing said cylinder housing and straddling said rotor, means embraced by said yoke members and interconnecting said yoke members on the other side of said disc, a pair of circumferentially spaced generally C-shaped castings straddling said rotor and engaging a respective one of said yoke members, said castings being substantially thicker than said yoke members to provide reinforcement therefor, said castings embracing said yoke members, and means securing said castings and yoke members to said cylinder housing on one side of said disc and to said interconnecting means on the other side of said disc.

2. The structure as recited in claim 1 wherein a support member is provided, said support member having a portion extending transversely to and across the periphery of said disc, means slidably securing said caliper to said support member, said last named means including a lug on each of said cast members radially spaced from a respective one of the edges of the portion of said yoke members which extends across the outer periphery of said disc, each said lug and its respective one of said edges forming a guide slot receiving said portion of said support member.

3. The structure as recited in claim 2 wherein said means for securing a respective said casting to a respective said yoke member and to said cylinder housing comprises at least one bolt extending through one casting, its respective yoke member and said cylinder housing.

References Cited by the Examiner
UNITED STATES PATENTS

| 2,820,530 | 1/58 | Chouings et al. | 188—23 |
| 3,035,664 | 5/62 | Desvignes et al. | 188—23 |

FOREIGN PATENTS

| 1,180,633 | 11/60 | France. |
| | | (1st addition to No. 74,065) |
| 1,174,269 | 3/58 | France. |
| 1,239,953 | 7/60 | France. |

ARTHUR L. LA POINT, *Primary Examiner.*

EUGENE G. BOTZ, *Examiner.*